P. H. THOMAS.
SYSTEM OF DISTRIBUTING ELECTRICAL ENERGY.
APPLICATION FILED MAY 6, 1903.

930,325.

Patented Aug. 3, 1909.

Witnesses:

Inventor
Percy H. Thomas,
by Charles A. Terry Atty ic
UNITED STATES PATENT OFFICE.

PERCY H. THOMAS, OF PITTSBURG, PENNSYLVANIA, ASSIGNOR TO COOPER HEWITT ELECTRIC COMPANY, A CORPORATION OF NEW YORK.

SYSTEM OF DISTRIBUTING ELECTRICAL ENERGY.

No. 930,325.     Specification of Letters Patent.     Patented Aug. 3, 1909.

Original application filed January 20, 1903, Serial No. 139,775. Divided and this application filed May 6, 1903. Serial No. 155,921.

*To all whom it may concern:*

Be it known that I, PERCY H. THOMAS, a citizen of the United States, and resident of Pittsburg, county of Allegheny, State of Pennsylvania, have invented certain new and useful Improvements in Systems of Distributing Electrical Energy, of which the following is a specification.

My invention relates to certain improvements in systems of electrical distribution.

The object of my invention is to provide means for delivering from suitable sources of alternating electric currents a flow of electric current in a given direction in two or more work or consumption circuits.

The general plan of the invention is to insert between the alternating source and two consumption circuits, suitable devices for permitting the flow of the positive impulses only to one circuit and permitting the flow of the negative impulses from the source to the other circuit. These two circuits may be so combined as to have a common return conductor.

There are various modifications in the general organization of the apparatus. Typical forms are illustrated in the accompanying drawings; in which—

Figure 1:
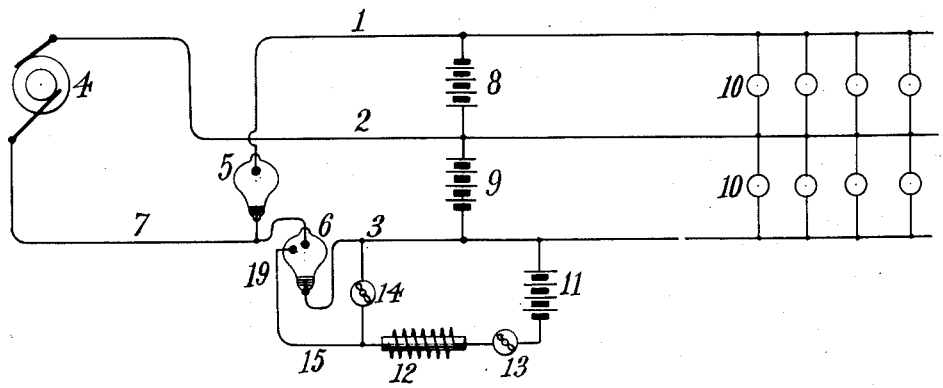
Figure 2:
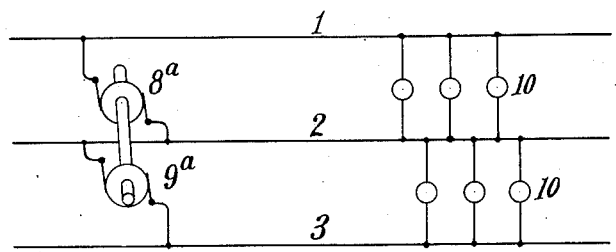
Figure 3:
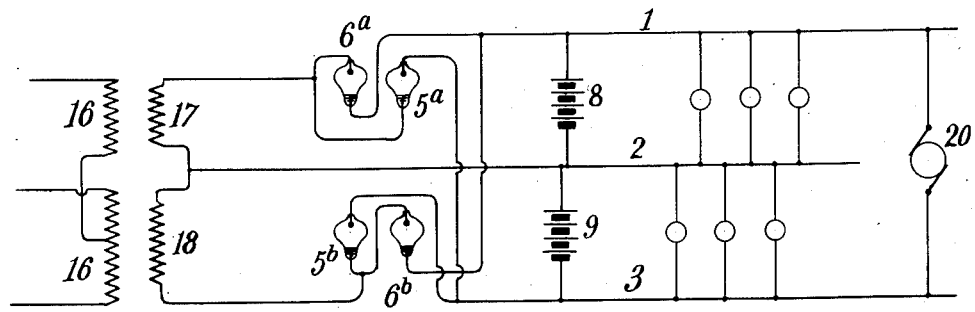

Figure 1 illustrates the invention as applied to a single phase source feeding a three-wire system; Fig. 2 illustrates a modification; and Fig. 3 illustrates a three-wire circuit supplied with two phase circuits derived from a three-phase source.

Referring to the drawings, 4 represents any suitable alternating current generator or transformer, or other source of alternating currents.

1, 2 and 3, represent the main conductors of a three-wire system of distribution or work circuit. The wire 2 is connected directly with one terminal of the source. The other terminal of the source is connected by a conductor, 7, through a suitable form of current rectifier, 5, with the main conductor 1, and also through a similar device, 6, with the main conductor 3. These current rectifiers are here diagrammatically represented as forms of the so-called Cooper Hewitt apparatus of the general character described in certain patents issued to him on September 17, 1901. They are usually constructed, however, somewhat shorter than when the devices are employed for giving light and have relatively large heat-radiating capacities. They consist generally of inclosing chambers containing a vapor which permits the passage of electric current between two electrodes, one at least of which may with advantage be of mercury and may serve to supply the contained vapor. These devices, as now well understood, will permit the passage of current under proper conditions in one direction while opposing a practically prohibitive resistance to the flow of current in the opposite direction. By arranging the current rectifier, 5, so as to permit the flow of positive current in the direction indicated by the arrow, that is to say, in the direction from the conductor 1, to the conductor 7, and arranging the rectifier 6, to permit the passage of positive current from the conductor 7, to the conductor 3, it will result that positive current from the conductor, 7, can flow to the work circuits 3, 2, only through the device 6, returning through the conductor 2, to the other side of the source; while positive impulses from the other terminal of the source can pass through the conductor 2, and thence through the work circuit to the conductor 1, and through the rectifier 5, back to the source by way of conductor 7, I have indicated the work circuit as supplying any suitable form of translating devices, 10, 10. It will thus be seen that the devices 10, between the conductors 2 and 3, will be supplied with successive positive impulses flowing in the direction from 3 to 2, and, likewise, the devices 10 between the conductors 2 and 1, will be supplied with positive impulses flowing from 2 to 1, these impulses alternating in time.

For the purpose of securing a more constant flow of current in the respective circuits, any suitable form of accumulator, such, for instance, as storage batteries, 8 and 9, may be connected across the respective circuits. These storage batteries will receive current and be charged by the successive impulses received, and during intervals of no current flow from the source, they will deliver current to their respective translating devices.

Instead of the storage batteries described with reference to Fig. 1, other forms of devices, such for instance, as a motor generator, $8^a$, $9^a$, may be connected between the several conductors in the manner shown in Fig. 2, for instance. The armatures may be mechanically connected on the same shaft or the momentum acquired by the device acting as a motor, may serve to operate it as a generator at the proper intervals. The operation of this device will be evident without further description.

The current rectifiers referred to usually require some form of starting device to permit the initial passage of current therethrough. Many forms of devices have been employed for such purposes. A convenient means is shown in Fig. 1, in connection with the device 6. It consists of a supplemental storage battery, 11, connected by means of a conductor, 15, between the conductor 3 of the corresponding terminal of the device 6. Included in the conductor 15, is a suitable reactive device, 12, and a circuit closing switch, 13, for completing its connections when desired. A switch, 14, may be employed for short-circuiting the device 6, to permit a flow of current through the reactive device 12. Upon a sudden breaking of this connection by the switch, 14, an impulse of high-electro-motive-force will be impressed upon the device 6, serving to overcome its resistance to starting. The circuit connections of the battery, 11, may then remain closed, if desired, insuring a sufficient flow of current from the supplemental electrode, 19, to the electrode connected with the conductor 3, to maintain the current rectifier in such condition as to permit the passage of positive currents. A similar arrangement may be employed in connection with the rectifier 5, if desired. Other means of insuring that the rectifier shall be in proper condition to permit the flow of positive currents at the proper times may be employed in lieu of that described.

In Fig. 3, a modification is illustrated in which a transformer having primary coils 16 adapted to receive three-phase currents, is employed. The secondary coils, 17 and 18, deliver two-phase currents to the three-wire circuit, 1, 2, 3. In this organization four rectifiers are employed, as illustrated at $5^a$, $6^a$ and $5^b$, $6^b$. The rectifiers $5^a$ and $5^b$, permit the flow of currents to the conductor 1, while the rectifiers, $6^a$ and $6^b$, permit the current delivered to the conductor 2, to pass through the work circuit by way of the conductor, 3, back to the respective terminals of the transformers 17 and 18. In this figure, I have shown in addition to the translating or consumption devices, 10, a translating device, 20, connected directly across the two wires, 1 and 3. This may represent any suitable form of device requiring the potential of the outside wires. The means for starting and maintaining in operative condition the device 6 of Fig. 1 may only be utilized similarly for the device 5 of Fig. 1, but may as well be utilized for devices $5^a$, $5^b$, $6^a$ and $6^b$.

From the foregoing description, it will be seen that the general arrangement of apparatus is applicable to other numbers of phases and arrangements of circuits, such, for instance, as three-wire three-phase circuits or two independent circuits out of synchronism. It is also apparent that the conductor 2 may consist of two wires instead of a single conductor.

This application is a division of an application Serial Number 139,775, filed by me January 20, 1903.

I claim as my invention:

In a system of electrical distribution, the combination with three-phase mains and means for deriving therefrom independent two-phase sources, of a three wire work circuit connected to two of the terminals of the said independent sources, the neutral wire of the receiving circuit being connected to the two other terminals of these sources and vapor electric devices connected between each of the outside direct current mains and each of the first named two phase terminals so directed as to pass current through the work circuit in one direction only, together with storage batteries between the receiving circuit mains and the neutral wire whereby energy from either of the independent two phase sources impresses a constant potential upon one only of the sides of the three wire receiving circuit.

Signed at New York, in the county of New York, and State of New York, this 28th day of April A. D. 1903.

PERCY H. THOMAS.

Witnesses:
Wm. H. Capel,
George H. Stockbridge.